United States Patent
Hurnik et al.

[11] Patent Number: 5,809,937
[45] Date of Patent: Sep. 22, 1998

[54] FARROWING CRATE

[75] Inventors: Jaromir Frank Hurnik; Jacob Hurnik, both of Guelph, Canada

[73] Assignee: J.K. Reid Manufacturing & Sales Ltd., Moorefield, Canada

[21] Appl. No.: 678,137

[22] Filed: Jul. 11, 1996

[51] Int. Cl.[6] ................................................. A01K 1/02
[52] U.S. Cl. ......................................................... 119/503
[58] Field of Search ................................... 119/503, 504, 119/505, 506, 507, 508

[56] References Cited

U.S. PATENT DOCUMENTS 3,509,854  5/1970  Osbahr .................................... 119/503

FOREIGN PATENT DOCUMENTS 3620089  1/1987  Germany ................................. 119/503
106450   6/1965  Norway ................................... 119/503

OTHER PUBLICATIONS

Parfet and Gonyou, "Directing the Teat–Seeking Behavior of Newbor Piglets: Use of sloped floors and curved Corners in the Design of Farrowing Units," Applied Animal Behaviour Science, 25, pp. 71–84, Sep. 1989.

Lou and Hurnik, "An Ellipsoid Farrowing Crate: Its Ergonomical Design and effects on Pig Productivity," Journal of Animal Science, pp. 2610–2615, Oct. 1994.

*Primary Examiner*—Edgar S. Burr
*Assistant Examiner*—Daniel J. Colilla
*Attorney, Agent, or Firm*—Lynn C. Schumacher; Dowell & Dowell

[57] ABSTRACT

A farrowing crate is disclosed. The farrowing crate includes an end support and an opposed end support. Back and front portions extend therebetween. Back and front portions includes top and bottom rails and a plurality of bowed bars extending therebetween. Back and front portions include an arcuate section and a straight longitudinal section. The curvature of the bowed bars vary along the length of the back and front portions. The curvature of bowed bars increases as they approach the arcuate section. The curvature of bowed bars decreases as they approach support members. The farrowing crate of the present invention provides enough space for the sow to turn around 360°, this allows the sow to visually monitor her piglets in all directions and allows her to change posture more easily. The farrowing crate provides adequate room for the sow to stand and lie down comfortably when she is aligned along the diagonal.

5 Claims, 4 Drawing Sheets

FARROWING CRATE

BACKGROUND OF INVENTION

1. Field of invention

This invention relates to farrowing crates and in particular farrowing crates that allow for a range of motion by the sow.

2. Description of the Prior Art

It is well established that sows during the lactation period can and do crush piglets. Various methods have been proposed to constrain the movement of the sow during that period so as to reduce the frequency of crushing deaths of the piglets.

Specifically, rectangular farrowing crates were developed to restrict the movement of the sow during parturition and lactation. The rectangular farrowing crates are designed so that the sow cannot turn around thereby severely restricting the movement of the sows. In some instances the sow also has difficulty with the smooth completion of the lying-down and getting-up action. These types of farrowing crates are commonly used by pig farmers.

The rectangular crates are now gaining a certain amount of notoriety, particularly among the animal rights/welfare proponents. The major problem with the rectangular farrowing crate is that the crate is not large enough to permit the sow to turn around 360°. The ability of the sow to turn around: a) permits physical exercise so that the sow can maintain muscle strength and general health; b) permits easier expression of vacuum nest-building activities before farrowing; c) enlarges the sow-piglet interaction zone, facilitating snout-snout contact between the sow and piglets; d) eases frustration resulting from the inability to visually inspect unexpected external stimuli such as piglets' squealing or sudden noises; and e) increase environmental complexity, thereby reducing boredom and boredom-related vices.

A more ergonomic model of a farrowing crate which allows for circling was developed which has an ellipsoid shape. This design is described in An Ellipsoid Farrowing Crate: Its Ergonomic Design and Effects on Pig Productivity, Zhensheng Lou and J. Frank Hurnik, *The Journal of Animal Science*, 1994:72, p2610 –2616. The main features of this carte are its oval or ellipsoid horizontal frame and the bowed vertical bars. The bowed vertical bars are uniformly shaped. The width of the ellipsoid crate at the lower rail which connects the lower end portions of the vertical bars is greater than the distance between the front and hind legs of the sow but less than the total length of the sow. The width of the ellipsoid crate at the middle portion of the vertical bars is greater than the length of the sow. Thus the ellipsoid crate allows the sow to turn but it does not allow the sow to lie down unless she is positioned along the length of the ellipsoid crate. There are a number of advantages of this crate since it allows for the sow to turn around. However, the ellipsoid farrowing crate uses more space than the generally accepted rectangular farrowing crate and there are portions of the ellipsoid farrowing crate which are considered to be wasted space.

Therefore it is desirable to provide a farrowing crate that allows the sow to turn around 360° but which occupies essentially the amount of space of the rectangular farrowing crate.

SUMMARY OF THE INVENTION

The present invention relates to farrowing crates which allows a sow to turn around 360°. The farrowing crate of the present invention has front and back portions which have top and bottom rails having an arcuate section and a straight longitudinal section. Front and back portions also have bowed bars which extend between top and bottom rails and which vary in curvature along the length of the front and back portions.

The farrowing crate of the present invention is for use inside a typical 5 by 7 foot (approximately 150 by 210 cm) rectangular pen. The farrowing crate comprises an end support, an opposed end support, a back portion and a front portion. The back portion is releasably attached at one end to end support and at the other end to opposed end support. Back portion has a top rail spaced from a bottom rail and a plurality of spaced apart bowed bars therebetween. The front portion is releasably attached at one end to end support and at the other end to opposed end support member. Front portion has a top rail spaced from a bottom rail and a plurality of spaced apart bowed bars therebetween. Top and bottom rail for both front and back portions, each have an arcuate section and a straight longitudinal section. The curvature of bowed bars varies such that the curvature of bowed bars increases as the bars approach the arcuate section and the curvature of bowed bars decreases as the bars approach end support member and opposed end support member.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE PREFERRED EMBODIMENT

Figure 1:
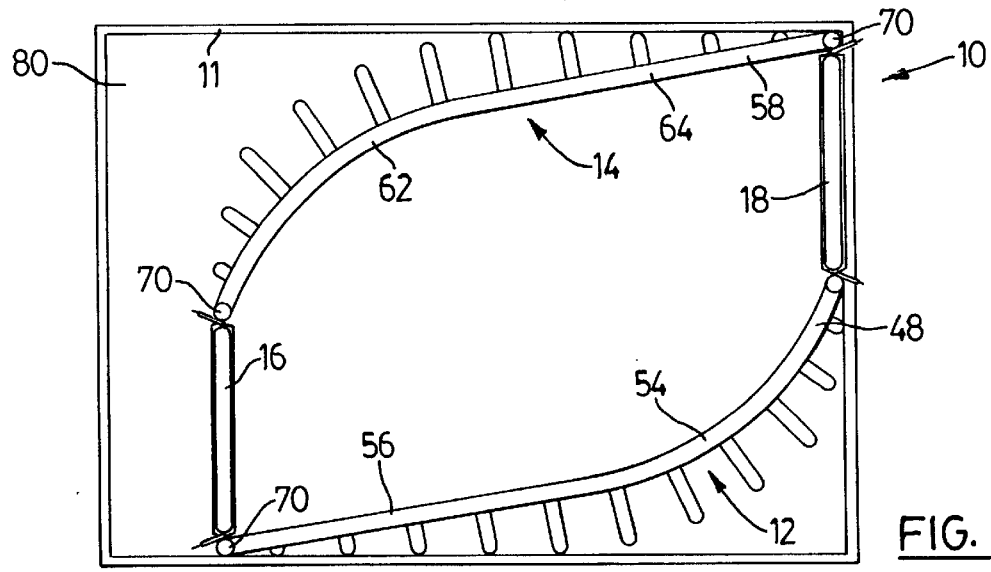
FIG. 1 is a top view of the farrowing crate constructed in accordance with the present invention.

Referring to drawings, and in particular FIG. 1, a farrowing crate is shown generally at 10. Farrowing crate 10 is for positioning in a generally rectangular pen 1 1. The crate as shown in FIG. 1 includes a front portion 12, a back portion 14, end support 16 and an opposed end support 18. It will be appreciated that the nomenclature of front, back, end and opposed end is used merely to distinguish these in the drawings and description rather than because of any innate orientation of these portions of the farrowing crate. A typical pen 11 is 5 feet by 7 feet (approximately 150 by 210 cm) and 18 inches high and keeps the piglets separated so that different litters cannot co-mingle. Pens 11 are typically made from plastic or metal.

Farrowing crate 10 can fit into an area of 5 feet by 6 feet. A typical farrowing pen 11 is 5 feet by 7 feet (approximately 150 by 210 cm). Accordingly, farrowing crate 10 of the present invention can be fitted into existing farrowing pens and thus existing barns.

Figure 2:
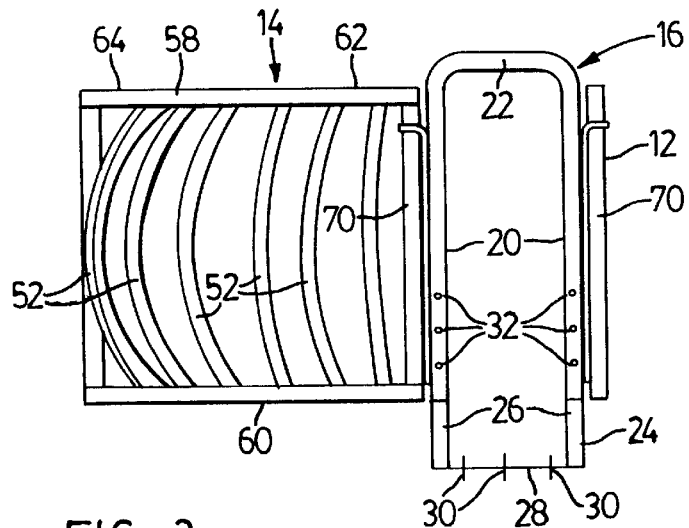
FIG. 2 is an end view of the end portion farrowing crate as shown in FIG. 1.
Figure 8:
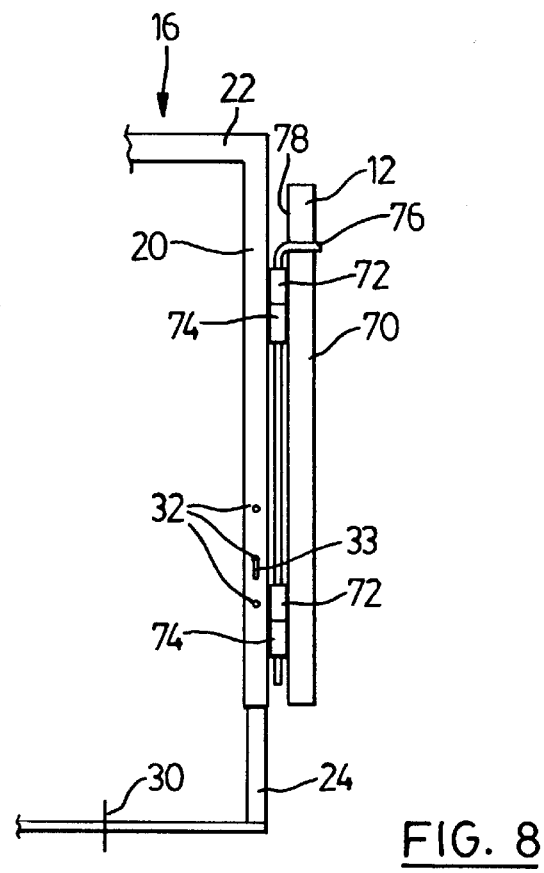
FIG. 8 is an enlarged side view of the connection between the support and the front portion.

Referring to FIG. 2 and, in part, to FIG. 8, end support 16 has a pair of spaced apart vertical support members 20 and a cross member 22. These are all formed of 2" tubular steel. Preferably vertical support members 20 and cross member 22 are integrally formed of the same tubular steel. The inventors used a spacing of 15.4 inches. Where the spacing is such that a sow can fit therethrough a barrier such as a sow feeder can be used to block the passage of the sow therethrough. Alternatively, bars or other types of barriers could also be used. End support 16 is adjustably attached to an end stand 24. End support includes a pair of inner vertical members 26 welded to a base plate 28. Preferably inner vertical members 26 are made from 1¾" tubular steel and base plate 28 is ¼" steel plate. Plate 28 has three holes (shown as vertical lines) 30 therein for receiving bolts (not shown). Thus end stand 24 may be bolted in position to the floor. Inner vertical members 26 fit snugly inside vertical members 22. Each inner vertical member 26 has a hole formed therein (not shown) for receiving a pin. Each vertical support member has a series of holes 32 formed therein. Holes 32 are adapted so that each can be positioned in registration with the hole formed in inner vertical member 26 and a pin (shown in FIG. 8) can be positioned therethrough. Thus, the height of end support 16 can be easily adjusted. A sow feeder (not shown) can be attached to end support member 16.

Figure 3:
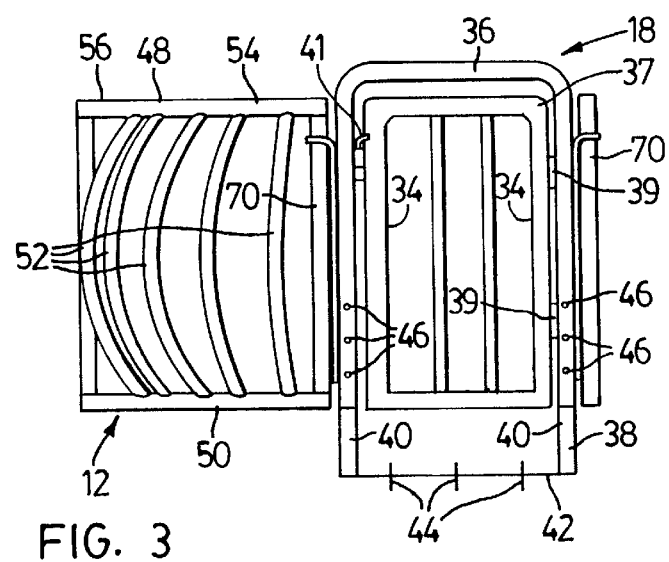
FIG. 3 is an end view of the opposed end portion of the farrowing crate as shown in FIG. 1.

Referring to FIG. 3, similarly, opposed end support 18 has a pair of spaced apart vertical support member 34 and a cross member 36. These are all formed of 2" tubular steel. Preferably vertical support members 34 and cross member 36 are integrally formed of the same tubular steel. The spacing between vertical support members 34 is such that a sow can fit therethrough. The inventors used a spacing of 26 inches between support members 34 of opposed end support 18. A door 37 is attached by hinges 39 to opposed end support 18 and is secured with a latch 41. Door 37 allows for ingress and egress of the sow. Opposed end support 18 is adjustably attached to an end stand 38.

End support 18 includes a pair of inner vertical members 40 welded to a base plate 42.

Preferably inner vertical members 40 are made from 1¾" tubular steel and base plate 42 is ¼" steel plate. Plate 42 has three holes (shown as vertical lines) 44 therein for receiving bolts (not shown). Thus, opposed end stand 38 may be bolted in position to the floor. Inner vertical members 40 fit snugly inside vertical support members 34. Each inner vertical member 40 has a hole formed therein (not shown). Each vertical support member 34 has a series of holes 46 formed therein. Holes 46 are adapted so that each can be positioned in registration with the hole formed in inner vertical member 40 and a pin (not shown) can be positioned therethrough to secure inner vertical member 40 to vertical support member 34. Thus, the height of opposed end support 18 can be easily adjusted. End support 16 and opposed end support 18 are positioned generally parallel.

Figure 4:
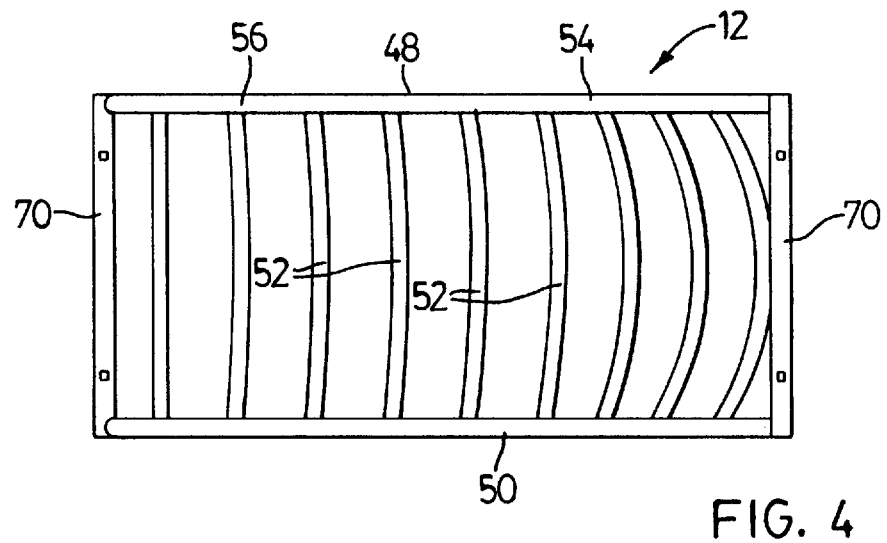
FIG. 4 is a front view of the front portion of the farrowing crate as shown in FIG. 1.

Referring to FIGS. 1, 3 and 4, front portion 12 extends between end support 16 and opposed end support 1 8. Front portion 12 includes an upper rail 48, a lower rail 50 and a plurality of outwardly bowed generally vertical bars 52. The shape of upper rail 48 and lower rail 50 is the same. Upper rail 48 and lower rail 50 each include an arcuate section 54 and a straight longitudinal section 56, as best seen in FIG. 1.

Figure 5:
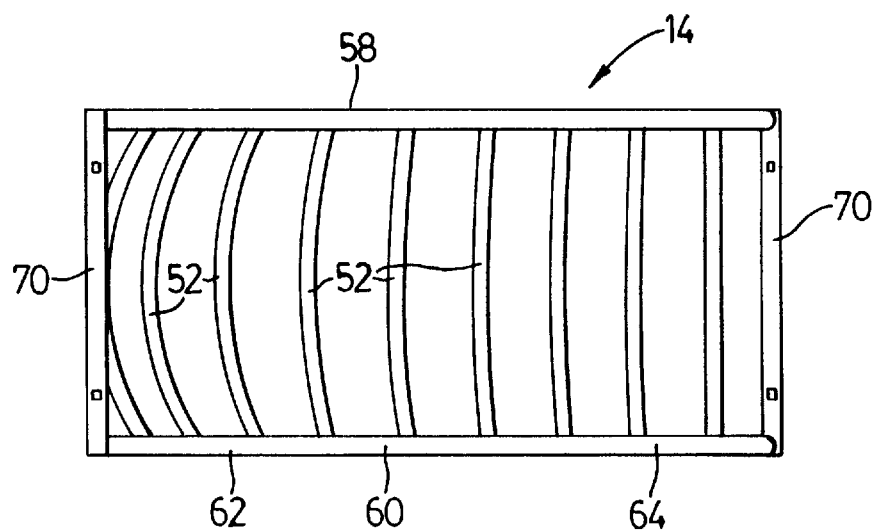
FIG. 5 is a back view of the back portion of the farrowing crate as shown in FIG. 1.
Figure 6J:
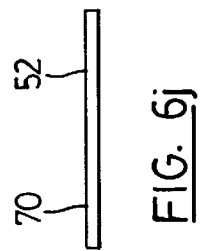
FIG. 6j is a side view of a bowed generally vertical bar for attachment to the upper and lower rails of front and back portions of the farrowing crate.
Figure 6G:
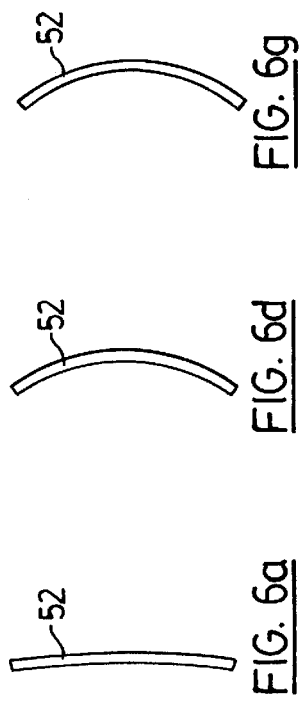
FIG. 6g is a side view of a bowed generally vertical bar for attachment to the upper and lower rails of front and back portions of the farrowing crate.
Figure 6D:
FIG. 6d is a side view of a bowed generally vertical bar for attachment to the upper and lower rails of front and back portions of the farrowing crate.
Figure 6A:
FIG. 6a is a side view of a bowed generally vertical bar for attachment to the upper and lower rails of front and back portions of the farrowing crate.
Figure 6H:
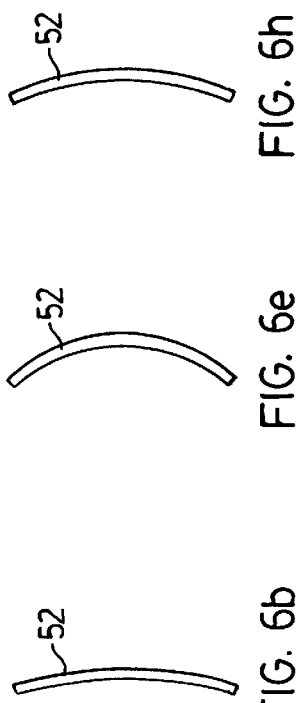
FIG. 6h is a side view of a bowed generally vertical bar for attachment to the upper and lower rails of front and back portions of the farrowing crate.
Figure 6E:
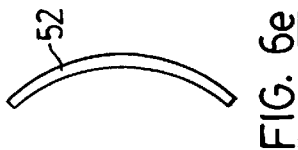
FIG. 6e is a side view of a bowed generally vertical bar for attachment to the upper and lower rails of front and back portions of the farrowing crate.
Figure 6B:
FIG. 6b is a side view of a bowed generally vertical bar for attachment to the upper and lower rails of front and back portions of the farrowing crate.
Figure 6I:
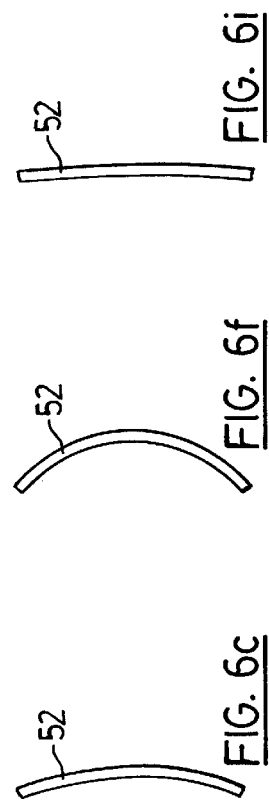
FIG. 6i is a side view of a bowed generally vertical bar for attachment to the upper and lower rails of front and back portions of the farrowing crate.
Figure 6F:
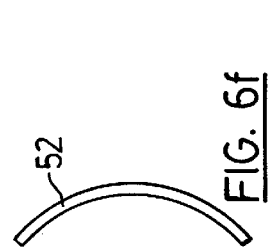
FIG. 6f is a side view of a bowed generally vertical bar for attachment to the upper and lower rails of front and back portions of the farrowing crate.
Figure 6C:
FIG. 6c is a side view of a bowed generally vertical bar for attachment to the upper and lower rails of front and back portions of the farrowing crate.

Referring to FIGS. 1, 2 and 5, similarly, back portion 14 extends between end support 16 and opposed end support 18. Back portion 14 includes an upper rail 58, a lower rail 60 and a plurality of outwardly bowed generally vertical bars 52. The shape of upper rail 58 is that same as the shape of lower rail 60. Upper rail 58 and lower rail 60 each include an arcuate section 62 and a longitudinal section 64.

Arcuate section 54 of front portion 12 is positioned diagonally opposed to arcuate section 62 of back portion 14.

Bowed bars 52 are spaced such that a sow cannot put her head between the bars. This ensures that the sow will not hurt herself. The maximum spacing between bars 52 that was used by the inventors was 20cm.

Figure 7:
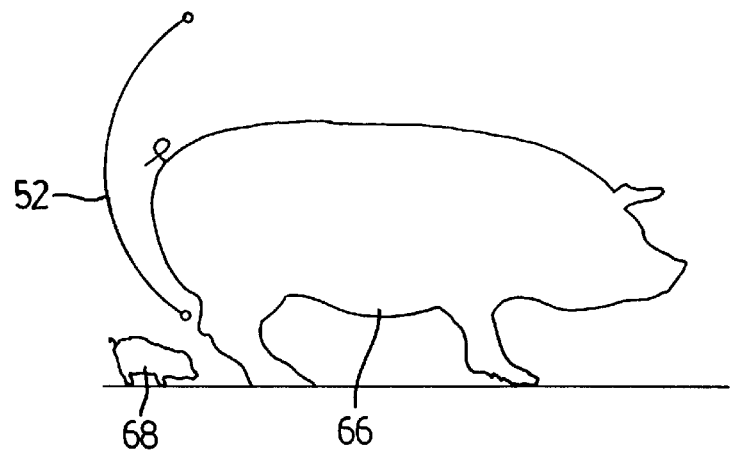
FIG. 7 is a partial sectional view of the farrowing crate showing the sow with her rump adjacent to a bowed generally vertical bar with the maximum curvature.

The shape of the outwardly bowed generally vertical bars 52 varies dependent on its position in the front or back portions 12 and 14 respectively. Various shapes of bowed bars 52 are shown in FIGS. 6, a through j, showing a progression in curvature of the bars. As the bowed vertical bars 52 approach the end of opposed end supports 12, 14 the maximum bow is adapted to the dorsal curvature of a sow in the lateral recumbent position. FIG. 7 shows a sow 66 positioned adjacent to back portion 12. The bowed bars 52 can be used by the sow to provide some support as she lies down. The height of front and back portions are set so that piglets 68 can pass freely thereunder. End bars 70 at each end of front and back portions 12 and 14 are straight.

Preferably upper 48, 58 and lower 50, 60 rails of front 12 and back 14 portions are made from 2" tubular steel. End bars 70 are also made from 2 " tubular steel. The remaining bowed bars 52 are made from 1½ tubular steel.

Back and front portions 12 and 14 are attached to end and opposed end supports 16 and 18 respectively with the same type of connection. One such connection will be described with reference to FIG. 8. Front portion 12 is releasably attached to end support 16. A pair of hollow tubes 72 extend outwardly from end bar 70. Similarly a pair of hollow tubes 74 extend outwardly from end support member 16. Hollow tubes 72 and 74 are aligned and elongate rod 76 extends therethrough. Elongate rod 76 has an upper end portion 78 which extends laterally therefrom.

A significant advantage of the present invention over previous farrowing crates is that it provides a space so that the sow can turn around 360° which allows her to monitor the piglets in every direction. This allows her to exercise so that she can maintain muscle strength and general health and have an easier means of expression of vacuum nest-building activities before farrowing. It also enlarges the sow-piglet interaction zone, facilitating snout-snout contact between the sow and piglets and eases frustration resulting from the inability to visually inspect unexpected external stimuli such as piglets' squealing or sudden noises. In addition it increases environmental complexity, thereby reducing boredom and boredom-related vices for the sow.

The farrowing crate of the present invention effectively utilizes the space. The farrowing crate 10 covers 5 by 6 feet of the 5 by 7 feet pen 11. This leaves a 5 by 1 foot area, shown in FIG. 1 as 80, that can be used for a number of purposes. Area 80 can be used by the piglets as a resting area. It can be provided with a heated floor or heated kennels for the piglets. In addition it can be provided with a feeder for the piglets.

Someone skilled in the art will appreciate that even though the crate 10 occupies only 5 by 6 feet of the pen 11 the sow is provided with enough room to lie down and stand up. In effect the sow is provided with more room along the diagonal than she had in a rectangular crate that was 5 by 7 feet.

The farrowing crate of the present invention provides enough space for the sow to turn around 360° while it provides safe space for the piglets to access the sow and a zone where the sow cannot crush the piglets. Where a sow becomes aggressive with the piglets or tries to savage them, which may occur after a first pregnancy, this farrowing crate provides a zone where the piglets can be safe. It provides areas for the sow to feed and drink, for the piglets to feed and drink, and for a heating bar. The farrowing crate 10 of the present invention provides all of these features and it is able to fit into a typical existing pen 11.

It will be appreciated that the above description related to one embodiment by way of example only. Specifically the size and shape of the members used are by way of example only. Many variations on the invention will be obvious to those skilled in the art and such obvious variations are within the scope of the invention as described herein whether or not expressly described. For example end support 16 could merely be a post with back portion 14 and front portion 12 each attached to the post, as long as the overall shape of the crate as viewed from above is maintained.

What is claimed as the invention is:

1. A farrowing crate for use inside a generally rectangular pen comprising an end support member;

an opposed end support member;

a back portion releasably attached at one end to the support member and at the other end to the opposed end support member, the back portion comprising a top rail spaced from a bottom rail and a plurality of spaced apart bowed bars therebetween, the bottom rail being spaced above the ground, the top and bottom rail each having an arcuate section and a longitudinal section, the curvature of the bowed bars varies such that the curvature of the bowed bars increases in the bowed bars decreases in the bowed bars approaching the end support member and the opposed end support member; and a front portion releasably attached at one end support member and at the other end to the opposed end support member, the back portion comprising a top rail spaced from a bottom rail and a plurality of spaced apart bowed bars therebetween, the bottom rail being spaced above the ground, the top and bottom rail each having an arcuate section and a longitudinal section, the curvature of bowed bars decreases in the bowed bars approaching the end support member and the opposed end support member.

2. A farrowing crate as claimed in claim 1 wherein the heights of the end support member and the opposed end support member are adjustable.

3. A farrowing crate as claimed in claim 1 wherein the end support member comprises a pair of spaced apart end vertical support members and a cross member extending therebetween and integrally attached thereto.

4. A farrowing crate as claimed in claim 3 wherein the opposed end support member comprises a pair of spaced apart opposed end vertical support, members and a cross member extending therebetween and integrally attached thereto.

5. A farrowing crate as claimed in claim 4 where the spaced between the opposed end vertical members is larger than the spacing between the end vertical members and wherein said crate is provided with a door extending between the opposed end vertical support members.

\* \* \* \* \*

UNITED STATES PATENT OFFICE
CERTIFICATE OF CORRECTION

PATENT NO. : 5,809,937                                    Page 1 of 2
DATED     : 09/22/98
INVENTOR(S) : Hurnik et al.

It is certified that error appears in the above-identified patent and that said Letters Patent are hereby corrected as shown below:

Claim 1, line 6, the phrase "support member" should read --end support member--;

Claim 1, line 13, after the phrase "in the bowed bars", --approaching the arcuate section and the curvature of the bowed bars-- should be inserted;

Claim 1, line 16, after the phrase "at one end", --to the end-- should be inserted;

Claim 1, line 23, before the word "decreases", --varies such that the curvature of the bowed bars increases in the bowed bars approaching the arcuate section and the curvature of the bowed bars-- should be inserted;

Claim 4, line 3, the comma "," should be deleted; and

Claim 5, line 2, the word "spaced" should read --spacing--.

UNITED STATES PATENT AND TRADEMARK OFFICE
CERTIFICATE OF CORRECTION

PATENT NO. : 5,809,937
DATED : 09/22/98
INVENTOR(S) : Hurnik et al.

It is certified that error appears in the above-identified patent and that said Letters Patent is hereby corrected as shown below:

Claim 4, line 3, the comma "," should be deleted; and

Claim 5, line 2, the word "spaced" should read --spacing--.

Signed and Sealed this

Ninth Day of March, 1999

Attest:

Attesting Officer

Q. TODD DICKINSON

Acting Commissioner of Patents and Trademarks